March 20, 1962 N. NEBOUT 3,026,230
APPARATUS FOR STORING AND PROCESSING STRIPS OF
RUBBER AND THE LIKE SHEET MATERIALS
Filed March 3, 1958 5 Sheets-Sheet 4
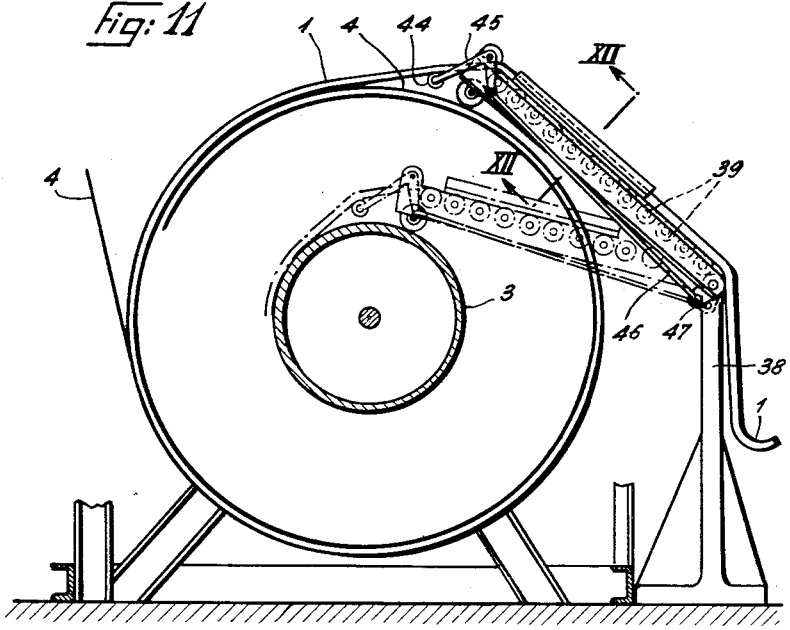
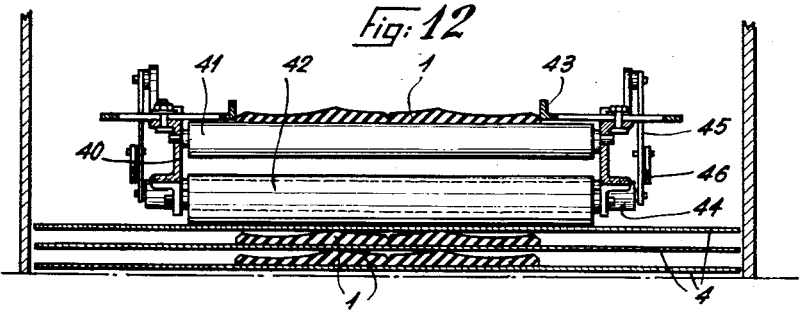
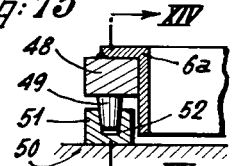
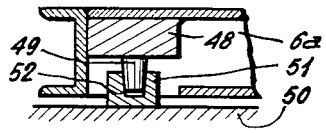
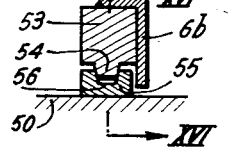
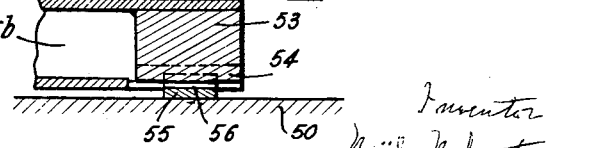

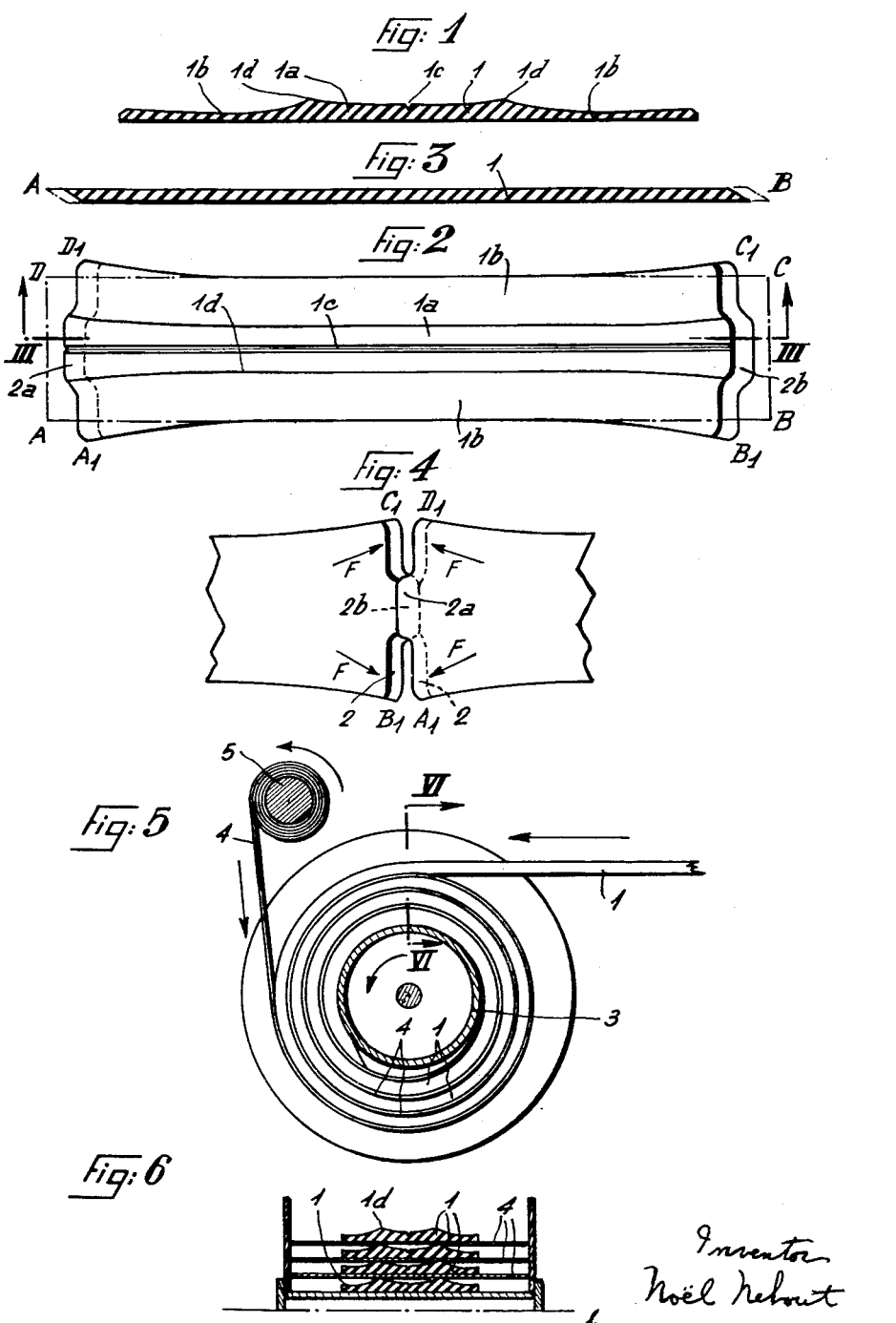

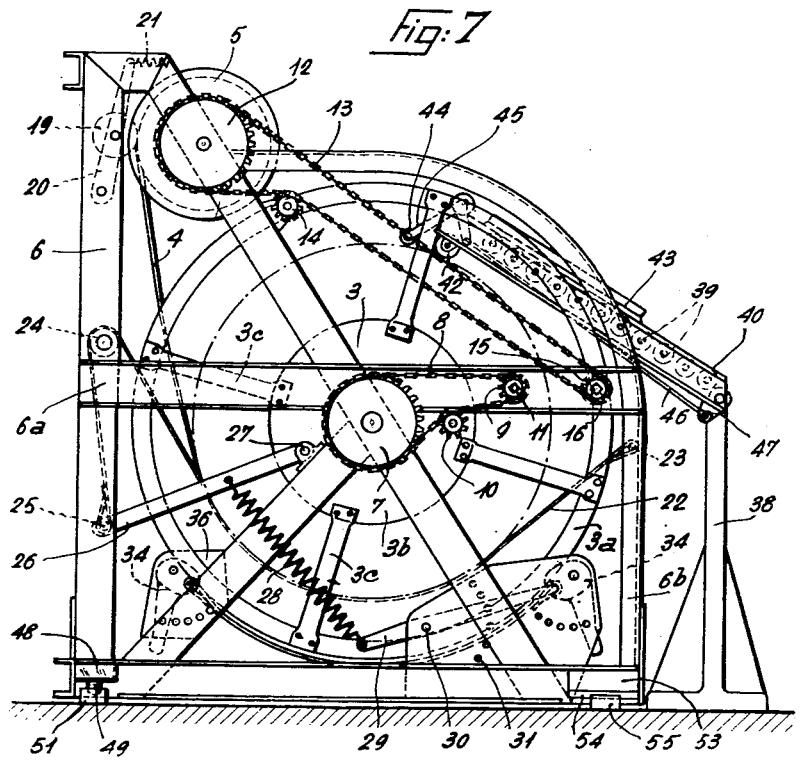

March 20, 1962 N. NEBOUT 3,026,230
APPARATUS FOR STORING AND PROCESSING STRIPS OF
RUBBER AND THE LIKE SHEET MATERIALS
Filed March 3, 1958 5 Sheets-Sheet 5
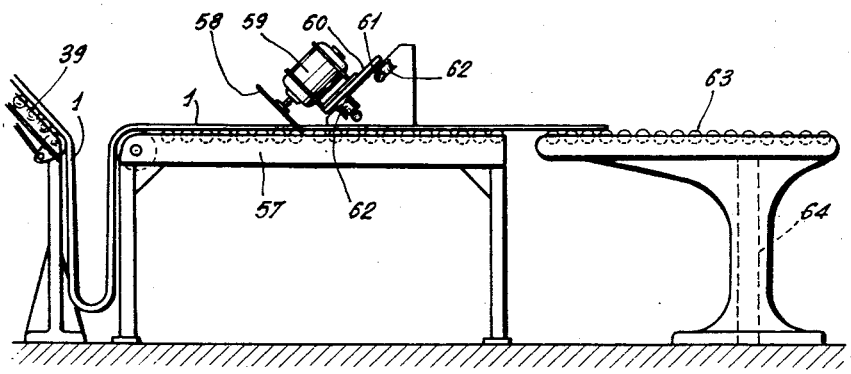
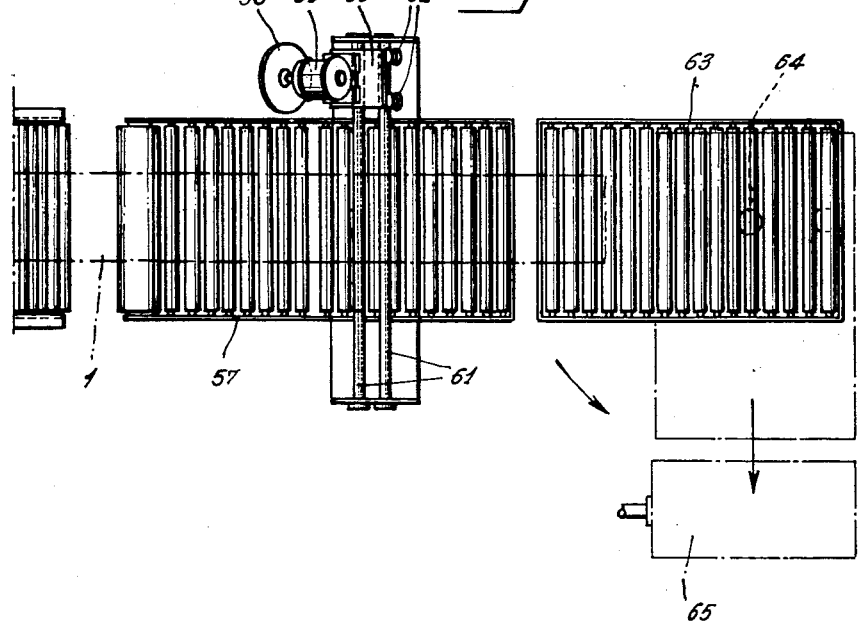

United States Patent Office 3,026,230
Patented Mar. 20, 1962

3,026,230
APPARATUS FOR STORING AND PROCESSING STRIPS OF RUBBER AND THE LIKE SHEET MATERIALS
Noël Nebout, Montlucon, Allier, France, assignor, by mesne assignments, to Dunlop Rubber Company Limited, London, England
Filed Mar. 3, 1958, Ser. No. 718,665
Claims priority, application France Mar. 21, 1957
7 Claims. (Cl. 156—128)

This invention relates to apparatus useful in the handling and processing of flexible sheet materials such as rubber, and is especially concerned with the application of such apparatus to tire manufacturing processes.

In the fabrication of pneumatic tires the tire treads are usually produced by means of an extruding press or similar machine which delivers at its output a continuous band or strip of rubber. This strip is passed from the output of the machine into one or more water tanks to cool. It is then cut into lengths corresponding to the circumference of the tire casings about which it is to be wrapped.

Even where the rubber strip travels a considerable distance, of e.g. 150 to 250 feet and more through the cooling tanks, still the strip is only surface-cooled as it reaches the cutting station and the cut pieces must undergo additional cooling before they are applied to the tire casings. As a result of this cooling as well as complex, and uncontrollable hysteresis effects, the cut lengths of tire tread contract and undergo substantial distortion in shape especially in the longitudinal dimension. The contraction in length is greater in the side portions of the tread since the thickness of the rubber material is less there than in the center. Consequently the longitudinal side edges of the tire tread assume a concave form while the transverse or end edges tend to assume an uneven convex form.

As a result of these dimensional changes and distortion the operator when wrapping the tire tread around the tire shaping drum or form is required to exert a violent pull upon the four corners of the tread in order to join the ends of the tread around the periphery of the tire. This pulling action is fatiguing and, further, results in further irregular distortion in the areas adjacent the corners of the tread and this can result in an intolerably high degree of dynamic unbalance in the finished tire.

It is an object of this invention to eliminate the above and similar difficulties connected with dimensional instability and distortion of tire treads during manufacture. A related object is to provide method and means of storing and stabilizing simultaneously bands or strips of rubber and similar flexible sheet materials in a particularly efficient and convenient way.

In accordance with the invention the band or strip of flexible material is wrapped or wound about a cylindrical drum or roller or the like, simultaneously with a strip of flexible but non extensible material such as metal strip, in juxtaposed relation therewith.

In accordance with another feature of the invention, the step just described makes it possible to deliver tire treads strips in a continuous uninterrupted manner to the processing machines, such as a shaping drum, and cut the strips to the desired lengths of the final tire treads only at the time the tread is to be applied to the tire. In this way the above described distortion and dimensional changes are completely eliminated.

In the process of the invention the continuous rubber strip will cool slowly and gradually while remaining applied throughout its length against the auxiliary inextensible, e.g. metallic, strip or band. When the rubber strip is then cut to length the cut lengths will not tend to present dimensional variations and will retain flat undistorted end shapes. Treads made in this way can easily be joined end-to-end about the tire casing without requiring exertion of muscular force and avoiding consequent deformation, thereby both facilitating the production process and improving the final product.

In fact it has been found that when the process of the invention is applied for storing rubber strips used in the manufacture of tire treads for pneumatic tires, greatly improved uniformity is obtained in the resulting tires as compared to similar tires made by the conventional methods and dynamic balancing is considerably improved. Tires and tire casings produced in this way constitute new articles of manufacture within the scope of the present invention.

This invention in an important aspect comprises apparatus which may essentially comprise a main drum and an auxiliary drum journalled in parallel spaced relation, a flexible inextensible strip, e.g. of metal, having its ends anchored to the respective drums, and means for concurrently winding and unwinding said strip together with a band of rubber or similar material to be stored, around one of said drums and off the other drum respectively.

Such a device may conveniently be used as a means of directly supplying the rubber band to further apparatus used in another step of the tire manufacturing process. Preferably the rubber strip stored as described above is only cut to length at the time it is about to be wrapped about a tire casing positioned on the shaping drum or form.

The ensuing description made with reference to the accompanying drawings will provide a clear understanding of the invention but is not intended to limit the scope thereof.

FIG. 1 is a transverse section of a rubber band used as a tire tread for pneumatic tires.

FIG. 2 is a plan view thereof on a smaller scale.

FIG. 3 is a section on line III—III of FIG. 2.

FIG. 4 is a partial diagrammatic view illustrating the joining of the opposite ends of a tire tread in a conventional process.

FIG. 5 is a diagrammatic view illustrating the principle of the invention.

FIG. 6 is a section on line VI—VI of FIG. 5.

FIG. 7 is a side view of a storing unit according to the invention.

FIG. 8 is a corresponding view in plan.

FIG. 11 is a detail view illustrating the operation of the unreeling means.

FIG. 12 is a larger-scale view in section on line XII—XII of FIG. 11.

FIG. 13 is a sectional view of a detail illustrating centering means.

FIG. 14 is a section on line XIV—XIV of FIG. 13.

FIG. 15 is a similar view similar to FIG. 13 illustrating a different form of centering means.

FIG. 16 is a section on line XVI—XVI of FIG. 15.

FIG. 17 is a diagrammatic view of a cutting station and

FIG. 18 is a corresponding view in plan.

Figure 9:
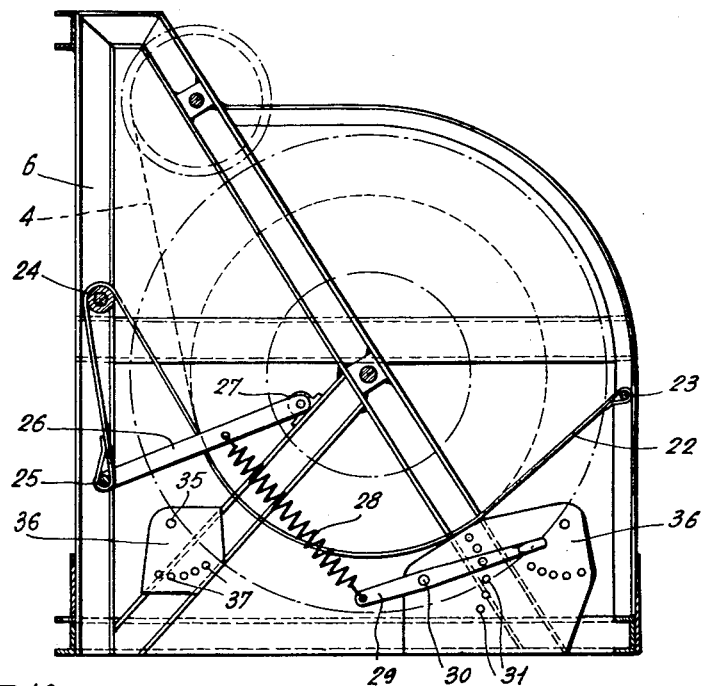
FIG. 9 is a diagrammatic view showing certain details of the unit.

Referring to FIGS. 1 to 3, a continuous rubber band for use in making tire treads is shown with the form as it issues from a conventional extruding press or other suitable machine, and comprises a continuous strip or band 1 which usually has a cross sectional contour similar to that shown in FIG. 1, including a central portion 1a forming the tread proper, and side portions 1b which are to provide the sides of the tire casing. The central portion 1a includes a longitudinal depression or groove 1c serving to center the band upon the shaper drum.

In the conventional methods of tire manufacture now in use, the strip as it issues from a cooling tank is cut into lengths such as ABCD as shown in FIGS. 2 and 3. These lengths or sections are then usually laid down flat on metallic tables on which they proceed to cool further since, as previously explained herein, the rubber strip is no more than surface cooled when it reaches the cutting station. Under the combined effect of the further cooling as well as various complex hysteresis phenomena in the structure of the rubber, the cut sections undergo non-uniform contraction, the contraction being a maximum in the longitudinal direction. Because the side portions 1b of the tread band are thinner than the central portion 1a as shown in FIG. 1, the tread band becomes distorted in the general manner illustrated in FIG. 2, i.e. the longitudinal sides AB and CD cave in while the smaller end sides AD and BC assume an uneven convex form as indication at $A_1D_1$ and $B_1C_1$.

When the operator has wrapped such a distorted tread band about the periphery of the shaper drum, the central portions 2a and 2b of the respective ends of the band can easily be brought into adjoining relation but gaps remain on either side of said central portions and the operator must pull the corners towards each other hard as indicated by the arrows F to distend the band and bring the corner portions 2 into coincidence. The strains resulting from such pulling occur principally in the corner areas of the tread and the tread becomes seriously distorted in those corner areas so that it assumes a non-uniform thickness. This often results in the presence of a dynamic unbalance in the finished tire resulting in a substantial proportion of rejects.

In accordance with the invention the rubber strip 1 is allowed to cool substantially completely prior to its being cut to lengths while being stored in surface engagement with a continuous cooling surface that is developable in character, i.e. one that can be flattened out on a plane without distortion. Because the rubber strip is in engagement with this cooling surface continuously throughout its length, it will undergo a much more uniform contraction. Moreover, since final lengths are cut at a time when the strip has already completed or substantially completed its contraction, i.e. has attained a dimensionally stable condition, the resulting tire treads are substantially undeformed. All the above mentioned difficulties during the shaping process on the shaper drum are thus removed and, among other advantages, dynamic unbalance in the final tire casing is eliminated or minimized.

Figure 10:
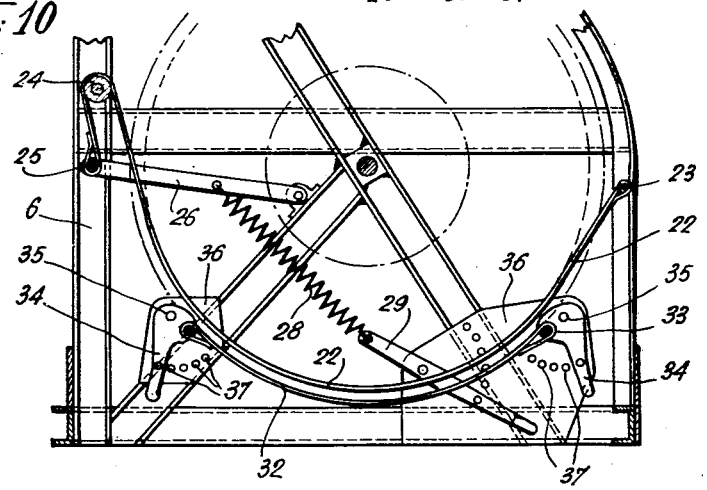
FIG. 10 is a detail view of the lower part of the unit.

Apparatus will now be described with reference to FIGS. 5 to 16 for carrying out the method of tire tread manufacture specified. In its broad lines the apparatus comprises a main drum 3 adapted to have one end of a uniform, thin-gauge metallic strip 4 attached to a point of the drum periphery. The strip may desirably comprise a strip of stainless steel. Wound around the drum 3 simultaneously with the strip 4 is a length of the rubber strip 1, so that the drum carries two intricated spiral coils respectively comprising the metal strip 4 and the rubber strip 1. The other end of the metal strip 4 is attached to the periphery of an auxiliary drum 5 of smaller diameter rotatable about an axis spaced from the axis of the main drum, so that the metal strip is reeled off the drum 5 concurrently as it is taken up around the drum 3.

As shown in section in FIG. 6, the rubber strip 1 is tightly applied along one of its faces, e.g. its under face, against the adjacent surface of the metal strip 4, and the under face of each turn of metal strip is supported upon the upwardly projecting ridge portions 1d of the upper surface of the rubber strip. Even though the metal strip is relatively thin gauge, e.g. of the order of one or two tenths of one millimeter in thickness, the coiled strip as a whole owing to its spiral curvature possesses high rigidity against transverse distortion. In other words the surface of the coiled metal strip remains practically developable, this term being taken with its mathematical meaning defined hereinabove.

It should further be noted that a high bonding force is produced tending to apply the rubber strip into tight engagement with the adjacent metal surface. It is shown mathematically that the bonding or adhesion force generated in this manner is proportional to the expression $e^{f\theta}$ where $e$ is the base of natural logarithms, $f$ is the coefficient of friction between rubber and metal, and $\theta$ is the angular extent of the surfaces in mutual engagement. In this expression, $f$ is high, and $\theta$ is especially high since it is equal to $2\pi$ times the number of spiral turns coiled about the drum. Due to this high bonding force the rubber strip is placed under a correspondingly high tension bias during cooling and this fact contributes to ensure that the cooled rubber strip will be dimensionally stable and will not undergo further deformation when cut into the required lengths. It will be noted from FIG. 6 that the metal strip 4 projects a substantial amount beyond each side of the rubber strip 1, thereby promoting cooling by radiation.

FIGS. 7 and 8 illustrate one example of a practical construction for the drum unit. As there shown, the main drum 3 and the auxiliary drum 5 are journalled on a rigid frame 6 constructed from channel members or the like, and a central cross member 6a is preferably provided across each side of the frame for convenient engagement, e.g. by the load fork of an elevator trunk or equivalent load handling means.

The drum 3 can be driven in rotation through a sprocket gear 7 secured to its hub and connected by a sprocket chain 8 with a drive sprocket 9. A tension gear 10 is provided in adjustable engagement with the chain 8 for adjusting the chain tension. The sprocket 9 has a drive coupling element 11 projecting axially from it for engagement with a complementary coupling element provided on suitable driving means or brake means, adapted to be brought into position for engagement of the complementary coupling elements according as the main drum is to be driven or retarded.

The auxiliary drum 5 is journalled in an upper side corner of the frame about an axis parallel to the axis of the main drum and spaced above and to one side of it. A sprocket gear 12 rotatable with drum 5 is driven through a chain 13, having a tension sprocket 14 associated with it, from a drive sprocket gear 15 provided with a coupling element 16 similar to coupling element 11. Thus, common driving and braking means may be used in connection with both drums, the driving means being coupled to one drum and the braking means with the other drum depending on which drum is to be driven and which retarded. The coupling elements 11 and 16 are provided on a common side of the frame remote from that on which the gears 7 and 12 are positioned, and said coupling elements are conveniently arranged to project outwards at horizontally aligned points of the side member 6a. Permanent brake means 17 and 18 are preferably provided for preventing drum rotation during idle periods and during transportation of the unit from one place to another.

The main drum 3 is shown as provided with end flanges in the form of annular members 3a connected with the hub 3b by way of radial spokes 3c. The smaller drum 5 is shown as having solid end flanges.

Due to the stiffness of the steel strip and its considerable length means have to be provided according to the invention to facilitate the reeling and unreeling of the strip on and from the drums. It is not sufficient to attach the ends of the strip to the peripheries of the respective drums and to rotate one drum to take up the steel strip thereon while retarding the other drum. Extremely high frictional forces would thus be generated between the surfaces of the steel strip and the flanges of the drums producing considerable wear, preventing smooth rotation and damaging the surfaces. According to a feature of the invention therefore means are provided for ensuring that there will be at all times at least one end turn of the steel strip wound around each drum and applied thereagainst preferably under resilient force, while the intervening length of strip between the drums is retained in slack condition.

For this purpose the auxiliary drum 5 has a presser roller 19 associated with it pivoted on a lever arm 20 and pressed by a spring 21 against the steel strip 4 wound around the drum. The roller 19 is so mounted as to engage the steel strip 4 substantially at the point where the strip becomes separated from the endmost complete turn wrapped around the drum. In the illustrated construction the point of engagement of the presser roller is positioned substantially on a common horizontal plane with the axis of the drum.

As regards the main drum the endmost turn of steel strip is applied over the strips preceding it by means of a flexible strap 22 (see FIG. 9) having one end attached to a cross member 23. The strap 22 is made to extend around the composite roll supported by the drum 5 over an arcuate extent of about 90° and is then passed over a roller 24 and is attached to a cross member 25 supported on lever arms 26 pivoted at 27 to the frame 6. The lever arms 26 are acted on by tension springs 28 having one end connected to an intermediate point of lever arms 26 and their opposite ends attached to the ends of tension adjusting levers 29 pivoted to the frame. Means such as an aperture in the lever 29 adapted to register with any selected one of an arcuate set of apertures 31 in the frame, and a movable pin insertable in the registering apertures, are provided for retaining the levers 29 in a desired angular setting.

After the storage drum unit described has had a length of rubber strip coiled on it the strip must be left in position on the main drum for any length of time required for purposes of storage and production schedule. In order to prevent the upper portions of the turns of strip from being flattened under the combined weight of the turns, means are provided for relieving the drum from the weight of the strips. Such means are illustrated in detail in FIG. 10 as comprising a cradle member 32 comprising a rigid part-cylindrical metal element equal in radius to that of the endmost turn of the steel strip 4 and pivotable to a position in which it engages the bottom portion of said outermost turn when the main drum is full. For this purpose cradle member 32 is freely pivoted at its ends on cross members 33 which in turn are supported on crank levers 34 pivoted at 35 on gusset plates 36 secured to the frame 6. Any suitable means, such as a hole in each crank 34 adapted to register with any one of a set of holes in 37 in the plates 36, and co-acting pins, are provided for retaining the crank levers in the desired settings to hold the cradle against the coil.

The system of crank levers 34 may be replaced by any equivalent arrangements, such as a threaded positioning screw means. It is necessary however that the supporting arrangement used should be positive rather than resilient in character since it would otherwise be liable to strain the rubber strip to such a degree as to impart a permanent set to it. Preferably the strap or belt 22 is slackened a maximum amount by action on the levers 29 at the time the cradle is applied.

Means will now be described with reference to FIGS. 11 and 12 for reeling the rubber strip 1 off the main drum 3. The means shown comprise an upstanding frame 38 to the top of which a table or platform 39 is pivoted comprising a frame 40 having rollers 41 journalled across it. The frame 40 includes a roll 42 journalled at its free or forward end and adapted to engage the outermost turn of the coil formed by the strip 4 on the drum 3. Laterally adjustable guides 43 are provided on the frame for centering the strip 1 along the table.

Means are provided for detaching the strip 1 from the metal strip 4 or forcing it away therefrom, for which purpose the table 39 includes an additional roll 44 of smaller diameter pivotally supported a certain distance beyond the front end of the table so as to be at all times positioned a very small distance away from the endmost turn of the steel strip 4 without however engaging said strip since otherwise it would tend to be rotated in opposite directions by the steel strip 4 and the rubber strip 1, and this would result in the rubber strip becoming jammed between the roll and the steel strip. In order to maintain at all times the proper spacing between the leading roll 44 and the steel strip 4 regardless of the position of the table 39 during the reeling-off of the rubber strip 1, the leading roll 44 is pivoted on levers 45 which are pivoted to the frame 40 and is actuated by a pull-rod 46 pivoted at a fixed point 47 on the frame 38. The linkage arrangement described makes it possible to drive the roll 44 mechanically if required, as by means of sprocket pinions positioned at the various pivotal axes of the leverage 45, 46, 47.

It is important that the apparatus described should be accurately positionable relatively to the outputs and inputs of remaining units of machinery delivering and receiving the rubber strip 1, when the subject apparatus is being loaded and unloaded. For this purpose, means are provided for centering the frame 6 as schematically shown in FIGS. 7, 8 and 13 to 16. As illustrated, a leg 6a of the frame 6 has a block 48 secured to it from which a taper pin 49 projects downwardly and is adapted to engage a complementary taper recess 52 formed in a socket 51 secured on the foundation block or base 50 where the apparatus of the invention is to be located. Another leg 6b of the stand 6 has a block 53 secured to it from which a trapezoidal ridge or tooth 54 projects adapted to engage a complementary trapezoidal groove 56 formed in a socket member 55 in the base 50. The guide means thus provided for two of the legs of the apparatus are sufficient for maintaining the latter correctly positioned so that the remaining legs of the frame can rest freely on suitably levelled horizontal supports.

The rubber strip 1 on issuing from the feed-out platform 39 (FIGS. 17 and 18) is passed to a cutting platform or table 57 with which is associated a conventional cutting device 58 positioned at a suitable angular slant and driven by a motor 59 mounted on a base 60 which is supported through rollers 62 thereof on transversely extending rails 61.

Beyond the cutting table is another table 63 swingable about a vertical shaft 64 and positioned adjacent to a shaper drum 65 so as to be movable to a position facing said drum for applying the tread around a tire casing on the drum. The tables or platforms 57 and 63 are provided with laterally adjustable guides, not shown for simplicity.

It will be understood that various changes may be made in the details illustrated without exceeding the scope of the invention.

What I claim is:

1. A system for storing and processing strips of resilient, heat-deformable material comprising in combination a frame, first and second horizontal axes journaled in said frame and spaced apart from each other, main auxiliary drums mounted on said first and second axes, respectively, for rotation therewith, a flexible metal strip having one of its ends attached to the periphery of said main drum and the other of its ends attached to the periphery of said auxiliary drum, said metal strip corresponding in length to that of said resilient, heat-deformable strips to be stored, means for alternately rotating said drums in a clockwise or a counterclockwise direction whereby said metal strip may either be reeled off said auxiliary drum and around said main drum together with said resilient, heat-deformable strip or be reeled off said main drum and around the auxiliary drum without said resilient, heat-deformable strip and movable cradle means associated with the main drum and movable to and from an operative position under said drum whereby when said cradle means is in operative position the bottom portion of said strips coiled on said main drum is cradled in said cradle means and the main drum is at least partially relieved from the weight of said strips.

2. A system for storing and processing strips of resilient, heat-deformable material comprising in combination a frame, first and second horizontal axes journalled in said frame and spaced apart from each other, main auxiliary drums mounted on said first and second axes, respectively, for rotation therewith, a flexible metal strip having one of its ends attached to the periphery of said main drum and the other of its ends attached to the periphery of said auxiliary drum, said metal strip corresponding in length to that of said resilient, heat-deformable strips to be stored, means for alternately rotating said drums in a clockwise or a counter-clockwise direction whereby said metal strip may either be reeled off said auxiliary drum and around said main drum together with said resilient, heat-deformable strip or be reeled off said main drum and around the auxiliary drum without said resilient, heat-deformable strip, a feed-out table pivoted to said frame adjacent the main drum and gravity-biased into engagement with an outermost turn of said rubber-like strip on said drum for feeding out said rubber-like strip as it is reeled off said main drum and a roller journalled on said table and riding on said outermost turn, and another roller journalled on said table beyond said first roller for rotatable engagement with the under surface of said outermost turn to facilitate the feed-out thereof.

3. In the system claimed in claim 2, linkage connected to said other roller and to said frame for automatically adjusting the spacing of said other roller beyond said first roller in accordance with the angular position of said table relative to the frame.

4. In a tire-making process, the method which comprises heating a continuous strip of substantial length of resilient, heat-deformable material, coiling said strip in a plurality of turns in juxtaposed relation with a second strip of flexible, inextensible heat-conducting material, whereby to develop relatively high bonding force on both sides of the strip of resilient heat-deformable material in proportion to the number of turns and placing same under corresponding high tension bias during cooling to dimensionally stabilize the resilient, heat-deformable material and to prevent deformation thereof when it is subsequently cut into required lengths, storing the resulting composite coil at least until said strip of resilient, heat-deformable material has substantially cooled, unwinding the coil, cutting said strip of resilient, heat-deformable material to predetermined lengths, and applying said lengths around tire casings to provide treads for the tires.

5. The method of processing a strip of resilient, heat-deformable sheet material of substantial length having a flat underface and a varying thickness over its cross-section defining ridges, which comprises the steps of coiling said strip in a plurality of turns in juxtaposed relation with a strip of flexible inextensible material while said resilient heat-deformable strip is in a heated non-stabilized condition, whereby to develop high bonding force on both sides of the strip in proportion to the number of turns and placing the resilient heat-deformable strip under corresponding high tension bias during cooling to dimensionally stabilize same and to prevent deformation thereof when subsequently cut into required lengths, and storing the resultant composite coil at least until said resilient, heat-deformable strip has substantially cooled and stabilized.

6. A system for storing and processing strips of resilient, heat-deformable material of substantial length comprising in combination a frame, main and auxiliary drums journalled on said frame for rotation around spaced parallel axes, a flexible metal strip having one of its ends attached to the periphery of said main drum and the other end attached to the periphery of said auxiliary drum and being of sufficient length so that it can be wound for a plurality of turns on said main drum, said metal strip corresponding in length to that of said resilient, heat-deformable strips to be stored, means for rotating the drums in directions to coil a resilient, heat-deformable strip in juxtaposed relation with said metal strip on said main drum and sufficiently to produce a plurality of turns on said main drum, whereby to develop high bonding force on both sides of the resilient, heat-deformable strip and place the resilient, heat-deformable strip under corresponding high tension bias during cooling to dimensionally stabilize same and to prevent deformation thereof when subsequently cut into required lengths, and means to rotate the drums in the opposite directions after cooling of the resilient, heat-deformable strip to reel the metal strip on the auxiliary drum and to uncoil the cooled resilient strip from the main drum.

7. In the system claimed in claim 6, presser means engageable with the outer surfaces of outermost turns of said strips around said drums.

References Cited in the file of this patent
UNITED STATES PATENTS

| | | |
|---|---|---|
| 1,792,316 | Leguillon | Feb. 10, 1931 |
| 2,434,541 | Bierer | Jan. 13, 1948 |
| 2,521,728 | Kastner | Sept. 12, 1950 |
| 2,592,724 | O'Neil | Apr. 15, 1952 |
| 2,734,553 | Rawls | Feb. 14, 1956 |
| 2,822,027 | Hollis | Feb. 4, 1958 |